United States Patent
Chen et al.

(10) Patent No.: US 7,377,769 B2
(45) Date of Patent: May 27, 2008

(54) DISCHARGE APPARATUS FOR TWO-STAGE INJECTION MOLDING MACHINE

(75) Inventors: Ming-Chi Chen, Hsinchu (TW); Ming-Chang Teng, Hsinchu (TW); Wen-Hung Feng, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 294 days.

(21) Appl. No.: 11/188,844

(22) Filed: Jul. 26, 2005

(65) Prior Publication Data

US 2006/0134261 A1   Jun. 22, 2006

(30) Foreign Application Priority Data

Dec. 21, 2004 (TW) .............................. 93139758 A (51) Int. Cl.
*B29C 45/30* (2006.01)
*B29C 45/23* (2006.01)

(52) U.S. Cl. ................. 425/557; 425/558; 425/559; 425/561; 425/562; 425/563; 425/567

(58) Field of Classification Search ........ 425/561–563, 425/557–559, 567, 207; 366/76.92, 77, 131, 366/182.4
See application file for complete search history.

(56) References Cited

U.S. PATENT DOCUMENTS

| | | | | |
|---|---|---|---|---|
| 2,386,966 | A | * | 10/1945 | MacMillin .................. 264/453 |
| 2,950,501 | A | * | 8/1960 | Harkenrider ................ 425/146 |
| 3,259,944 | A | * | 7/1966 | McIlvin ...................... 425/154 |
| 4,290,701 | A | * | 9/1981 | Schad .......................... 366/77 |
| 5,011,399 | A | * | 4/1991 | Farrell ........................ 425/557 |
| 5,076,777 | A | * | 12/1991 | Schmitt .................... 425/133.5 |
| 5,135,701 | A | * | 8/1992 | Farrell ..................... 264/328.1 |
| 5,246,660 | A | * | 9/1993 | Tsutsumi ................ 264/328.17 |
| 5,286,187 | A | * | 2/1994 | Niimi et al. ................ 425/205 |
| 5,366,366 | A | * | 11/1994 | Yokoyama .................. 425/145 |
| 5,380,187 | A | * | 1/1995 | Fujikawa .................... 425/561 |
| 5,509,797 | A | * | 4/1996 | Nakamura .................. 425/557 |
| 5,616,350 | A | * | 4/1997 | Wissmann et al. ........ 425/133.1 |
| 5,770,245 | A | * | 6/1998 | Takizawa et al. ........... 425/549 |
| 5,858,420 | A | | 1/1999 | Szajak et al. |
| 6,187,229 | B1 | * | 2/2001 | Takayama et al. ......... 264/1.33 |

(Continued)

FOREIGN PATENT DOCUMENTS

JP    11207795 A  *  8/1999

*Primary Examiner*—Philip C Tucker
*Assistant Examiner*—Dimple N Bodawala
(74) *Attorney, Agent, or Firm*—Rabin & Berdo, P.C.

(57) ABSTRACT

A discharge apparatus for a two-stage injection molding machine, includes a check shaft seat having a runner, and disposed between a feeding portion and an injection portion of the two-stage injection molding machine, for allowing a plastic material in the feeding portion to enter the injection portion via the runner; at least one check shaft disposed in the check shaft seat, and for opening and closing the runner via movement of the check shaft; at least one cover provided at a side of the check shaft seat, and having at least one discharge hole for discharging residues of the plastic material between the check shaft seat and the check shaft; and at least one adjustable unit for adjusting a discharge speed of the residues of the plastic material. The discharge hole and the adjustable unit can prevent locking of the check shaft and pollution from degraded residues of plastic material.

22 Claims, 5 Drawing Sheets

U.S. PATENT DOCUMENTS

| | | | |
|---|---|---|---|
| 6,200,127 B1 * | 3/2001 | Klaus | 425/557 |
| 6,540,006 B2 * | 4/2003 | Kono | 164/113 |
| 6,649,094 B1 * | 11/2003 | Galt et al. | 264/39 |
| 6,655,445 B2 * | 12/2003 | Kono | 164/113 |
| 6,739,379 B2 * | 5/2004 | Kono | 164/113 |
| 6,739,862 B2 * | 5/2004 | Dray | 425/557 |
| 6,742,570 B2 * | 6/2004 | Kono | 164/312 |
| 6,789,603 B2 * | 9/2004 | Kono | 164/113 |
| 6,942,006 B2 * | 9/2005 | Kono | 164/113 |
| 7,140,860 B2 * | 11/2006 | Chen et al. | 425/145 |

* cited by examiner

DISCHARGE APPARATUS FOR TWO-STAGE INJECTION MOLDING MACHINE

FIELD OF THE INVENTION

The present invention relates to discharge apparatuses for two stage injection molding machines, and more particularly, to a discharge apparatus for discharging residues of plastic material of a two-stage injection molding machine.

BACKGROUND OF THE INVENTION

Two-stage injection molding machines are widely used in accordance with the requirements of high precision and good quality in injection molding. A typical two-stage injection molding machine is illustrated in FIG. 5, which comprises a feeding portion 50 and an injection portion 55, wherein the feeding portion 50 provides metering and check functions to achieve a precise metering effect and thereby improve the quality of injection molding.

Figure 5:
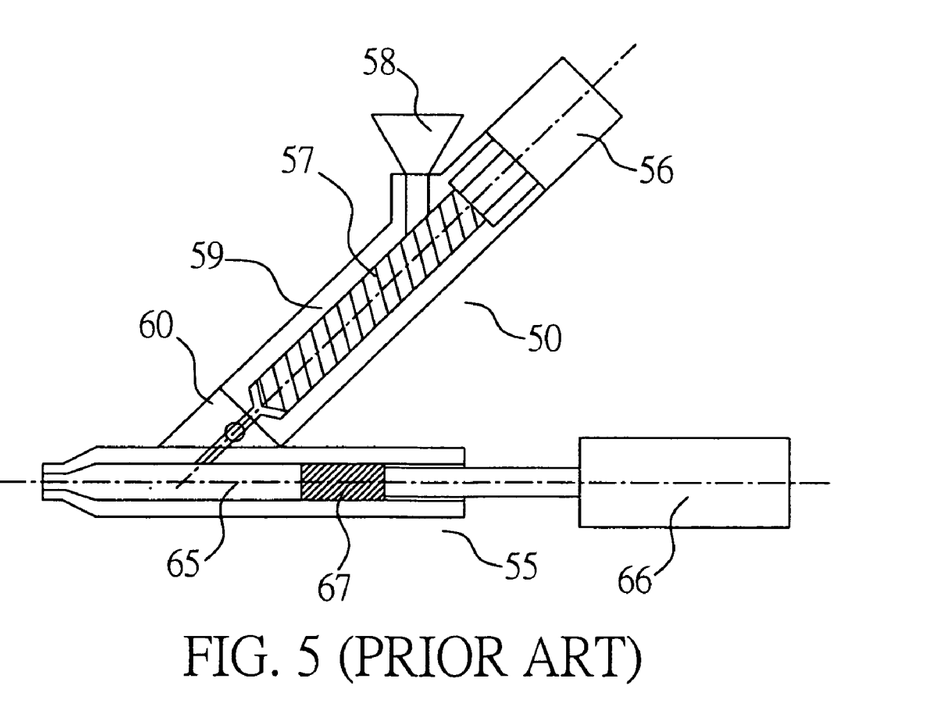
FIG. 5 (PRIOR ART) is a schematic diagram of a conventional two-stage injection molding machine.

As shown in FIG. 5, the two-stage injection molding machine is operated by allowing a motor 56 to drive a metering screw 57 to rotate, such that plastic material in a material hopper 58 enters a tube 59 to mix and melt to form melted plastics, and a check shaft 61 in a check shaft seat 60 is opened to allow the melted plastics to enter an injection tube 65. After a required injection volume and a back pressure of the melted plastics are provided, the check shaft 61 is closed. Then, a driver 66 drives an injection rod 67 to move forward and force the melted plastics to be injected.

Figure 6A:
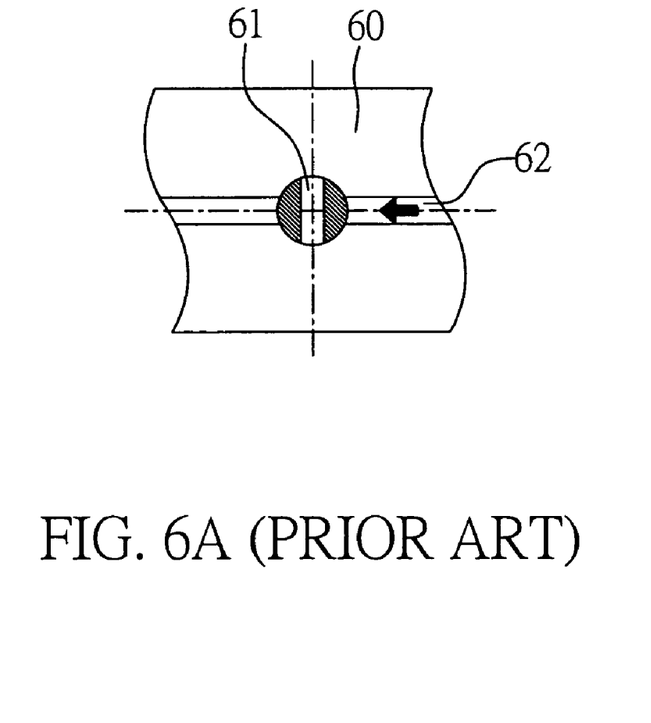
FIGS. 6A and 6B (PRIOR ART) are schematic diagrams of cooperation between a check shaft and a check shaft seat of the conventional two-stage injection molding machine.
Figure 6B:
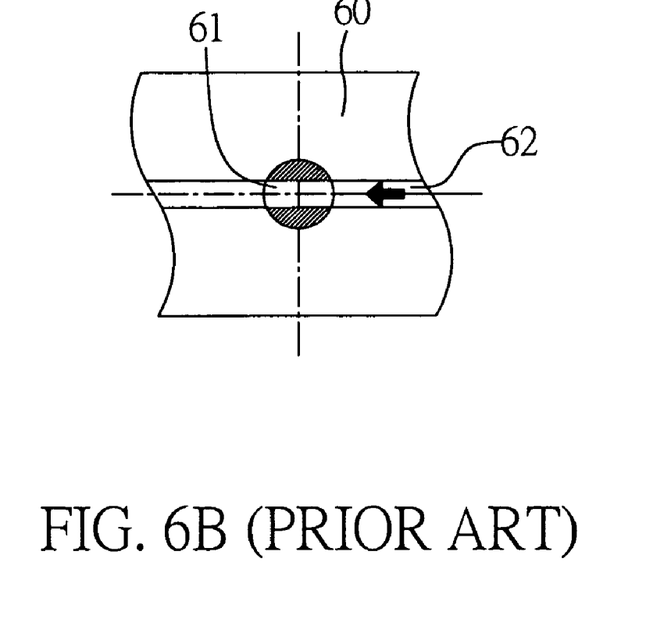

As shown in FIGS. 6A and 6B, the check shaft 61 is used to control the opening or closing of a runner 62 of the check shaft seat 60 by rotation of the check shaft 61, so as to prevent the melted plastics of high pressure in the injection tube 65 from reversely flowing into the tube 59 to cause an unstable injection pressure and unstable measurement of the melted plastics. Such design is very important to precise injection molding having a strict requirement of injection precision. U.S. Pat. No. 5,858,420 discloses a two-stage injection molding machine as shown in FIG. 7, which employs a similar design having axial movement of a check shaft 71 cooperate with a check shaft seat 70 to achieve the metering and check functions.

Figure 7:
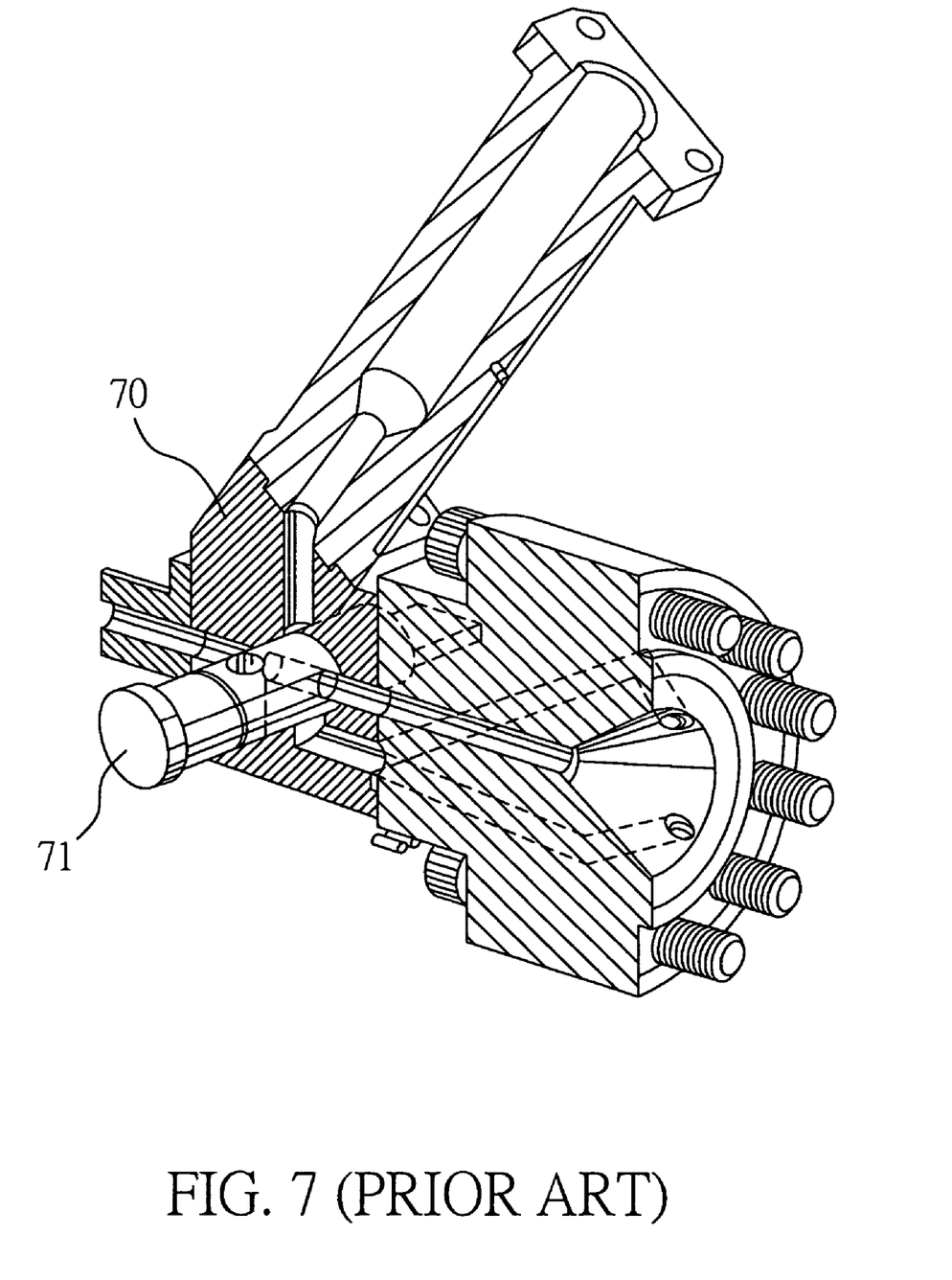
FIG. 7 (PRIOR ART) is a schematic diagram of a two-stage injection molding machine disclosed in U.S. Pat. No. 5,858,420.

However, for the foregoing two-stage injection molding machines shown in FIGS. 5 to 7, during practical operation thereof, relative motion between the check shaft 61, 71 and the corresponding check shaft seat 60, 70 causes a gap therebetween and easily leads to overflow and leakage of the melted plastics. In order to solve this problem, conventionally, the gap between the check shaft 61, 71 and the check shaft seat 60, 70 is made smaller (i.e. tolerance is decreased), or an anti-leakage device is additionally provided to prevent the overflow situation. Since the melted plastics of high pressure easily flow into the gap during the injection and metering processes, if the gap is made too small, the check shaft 61, 71 may be locked and fail to rotate. Furthermore, for plastic material added with fibers or powders, if it flows into the gap and cannot be discharged, it may be burned and broken due to overheating; if such residues of the plastic material is mixed with the melted plastics, the quality of finished products would be seriously degraded (especially for transparent finished products of injection molding).

Therefore, the problem to be solved here is to provide a discharge apparatus applied in a two-stage injection molding machine, to prevent locking of a check shaft and pollution from degraded residues of plastic material.

SUMMARY OF THE INVENTION

In light of the foregoing drawbacks of the conventional technology, an objective of the present invention is to provide a discharge apparatus for two-stage injection molding machine, which can prevent locking of a check shaft.

Another objective of the present invention is to provide a discharge apparatus for two-stage injection molding machine, which can prevent the quality of finished products from being polluted by degraded residues of plastic material.

Still another objective of the present invention is to provide a discharge apparatus for two-stage injection molding machine, which can extend the overall lifetime.

A further objective of the present invention is to provide a discharge apparatus for two-stage injection molding machine, which can collect residues of a plastic material.

A further objective of the present invention is to provide a discharge apparatus for two-stage injection molding machine, which can assure the good appearance.

In accordance with the above and other objectives, in one embodiment, the present invention proposes a discharge apparatus for a two-stage injection molding machine, comprising a check shaft seat having a runner, and disposed between a feeding portion and an injection portion of the two-stage injection molding machine, for allowing a plastic material in the feeding portion to enter the injection portion via the runner; at least one check shaft disposed in the check shaft seat, and for closing the runner if necessary to stop supplying the plastic material; and at least one cover provided at a side of the check shaft seat, and having at least one discharge hole for discharging residues of the plastic material between the check shaft seat and the check shaft.

In another embodiment, the present invention proposes a discharge apparatus for a two-stage injection molding machine, comprising a check shaft seat having a runner, and disposed between a feeding portion and an injection portion of the two-stage injection molding machine, for allowing a plastic material in the feeding portion to enter the injection portion via the runner; at least one check shaft disposed in the check shaft seat, and for opening and closing the runner via movement of the check shaft; at least one cover provided at a side of the check shaft seat, and having at least one discharge hole for discharging residues of the plastic material between the check shaft seat and the check shaft; and at least one adjustable bolt for adjusting a diameter of the discharge hole.

In a further embodiment, the present invention proposes a discharge apparatus for a two-stage injection molding machine, comprising a check shaft seat having a runner, and disposed between a feeding portion and an injection portion of the two-stage injection molding machine, for allowing a plastic material in the feeding portion to enter the injection portion via the runner; at least one check shaft disposed in the check shaft seat, and for opening and closing the runner via movement of the check shaft; at least one cover provided at a side of the check shaft seat, and having at least one discharge hole for discharging residues of the plastic material between the check shaft seat and the check shaft; and at least one adjustable unit comprising an adjustable bolt, an adjustable spring and a leakage stop block, and for adjusting a pressure applied to the discharge hole.

In a further embodiment, the present invention proposes a discharge apparatus for a two-stage injection molding machine, comprising a check shaft seat having a runner, and disposed between a feeding portion and an injection portion of the two-stage injection molding machine, for allowing a plastic material in the feeding portion to enter the injection portion via the runner; at least one check shaft disposed in the check shaft seat, and for opening and closing the runner via movement of the check shaft; at least one cover provided at a side of the check shaft seat, and having at least one discharge hole for discharging residues of the plastic material between the check shaft seat and the check shaft; and at least one adjustable shaft for adjusting opening and closing of the discharge hole.

The adjustable bolt, the adjustable unit, and the adjustable shaft are disposed in the discharge hole of the cover, for adjusting and controlling a discharge speed of the residues of the plastic material in accordance with characters of the plastic material.

Moreover, during a feeding process, the check shaft performs movement to open the runner to supply the plastic material; when the feeding process is stopped, the check shaft performs movement to close the runner to stop supplying the plastic material.

Therefore, by the discharge apparatus for two-stage injection molding machine in the present invention, a problem of the check shaft being locked in the conventional technology is solved, and pollution from degraded residues of plastic material to finished products can be prevented, thereby extending the overall lifetime. Further, the design of the present invention provides functions of precisely metering material leakage and collecting material residues, thereby avoiding a problem of affecting the overall appearance due to an uncontrollable material leakage path.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
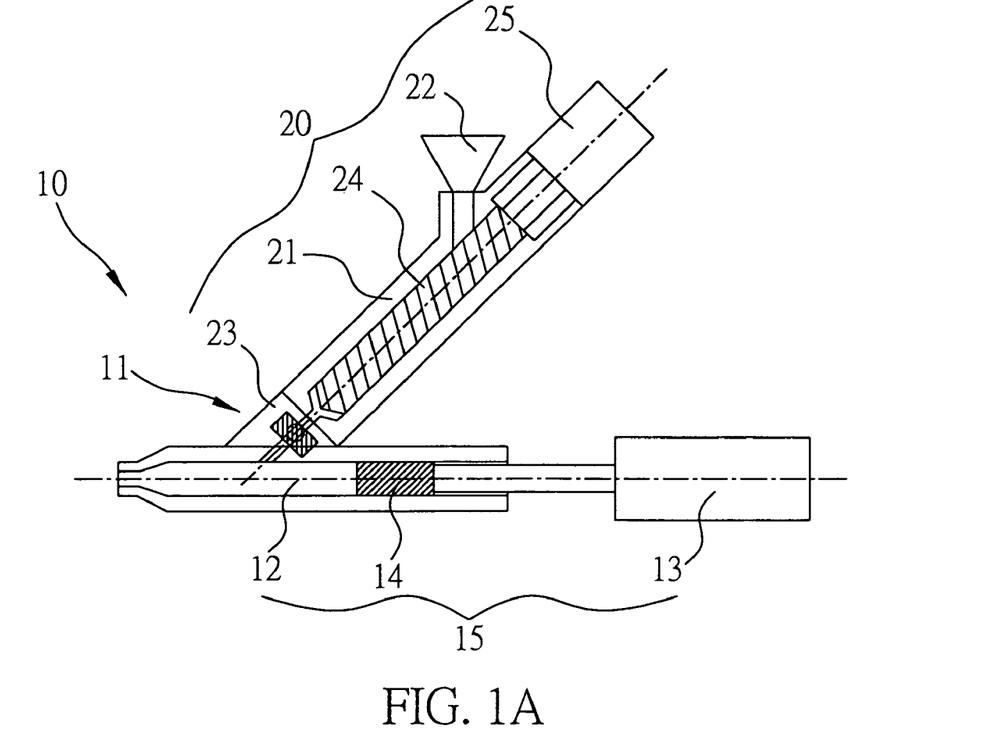
FIG. 1A is a schematic diagram showing a layout of a discharge apparatus for two-stage injection molding machine according to the present invention.
Figure 1B:
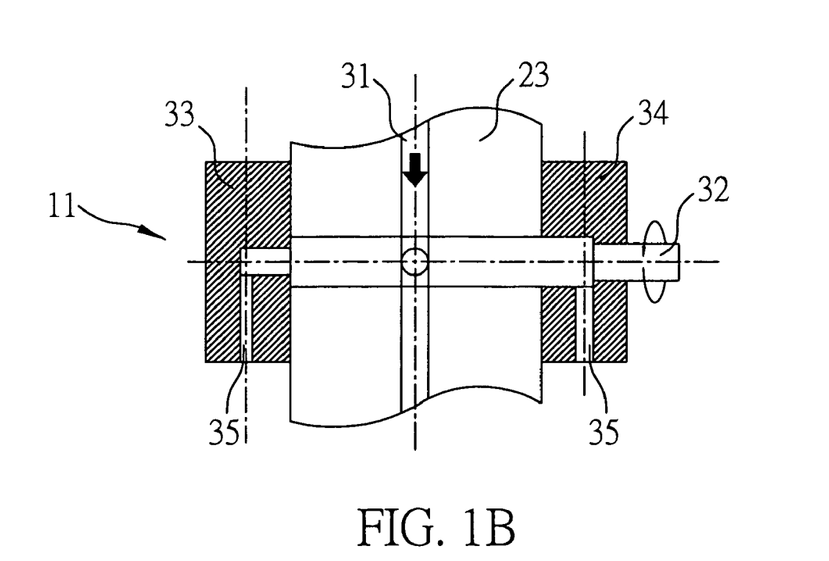
FIG. 1B is a schematic diagram showing the discharge apparatus for two-stage injection molding machine according to a first embodiment of the present invention.

FIGS. 1A and 1B show a discharge apparatus 11 for a two-stage injection molding machine 10 according to a first embodiment of the present invention. As shown in FIG. 1A, the two-stage injection molding machine 10 comprises an injection portion 15 having an injection tube 12, a driving unit 13 and an injection rod 14; and a feeding portion 20 disposed on the injection portion 15 and tilted by a predetermined angle with respect to the injection portion 15. A material such as a plastic material is fed into the injection tube 12 of the injection portion 15 via the feeding portion 20, and is ejected by means of the injection rod 14 driven by the driving unit 13 such as a driver to complete the injection molding. Further as shown in FIG. 1A, the feeding portion 20 for performing measurement comprises a tube 21, a material hopper 22, a check unit 23 (such as a check shaft seat), a feeding screw 24, and a feeding driving motor 25, wherein the feeding driving motor 25 drives the feeding screw 24 to feed and measure the material. Besides, other types of feeding portions can also be employed to achieve the same feeding and metering effects, such as a screw-free heating feeding/metering portion, an ultrasonic heating feeding/metering portion and so on, which are all applicable in the present invention.

The discharge apparatus 11 in the present invention is disposed between the injection portion 15 and the feeding portion 20. As shown in FIG. 1B, the discharge apparatus 11 comprises the check shaft seat 23 for connecting the injection portion 15 and the feeding portion 20 together, wherein the check shaft seat 23 has a runner 31 for allowing the plastic material (such as PC, ABS, PMMA, etc.) in the feeding portion 20 to enter the injection portion 15 via the runner 31. Further, a check shaft 32 is disposed in the check shaft seat 23 and is perpendicular to the runner 31, such that the runner 31 can be opened or closed by rotation of the check shaft 32 to start or stop the supply of the plastic material, thereby achieving a function of precisely metering the material feeding. Moreover, a first cover 33 and a second cover 34 are provided at two opposite sides of the check shaft seat 23 respectively, wherein at least one discharge hole 35 is formed in the first cover 33 and the second cover 34 respectively, for discharging residues of the plastic material between the check shaft seat 23 and the check shaft 32, and the discharged residues of the plastic material are collected by a collecting hopper (not shown) arranged in the discharge direction of the discharge hole 35.

The size and arrangement of the discharge hole 35 are designed according to characters of the plastic material. In this embodiment, the direction of the discharge hole 35 is perpendicular to the check shaft 32. However, the number, location, direction or size/diameter of the discharge hole 35 are not particularly limited in the present invention and can be adjusted according to the characters of the plastic material (such as fluidity) and user's requirements.

Consequently, by the discharge apparatus in the present invention, during operation, the check shaft 32 can be rotated to open or close the runner 31 of the check shaft seat 23 to perform or stop feeding of the plastic material; and residues of the plastic material between the check shaft 32 and the check shaft seat 23 can be discharged via the discharge hole 35 formed in the first and second covers 33, 34, such that problems in the conventional technology, such as the check shaft being locked or finished products being polluted by degraded residues of plastic material, can be avoided.

Besides the above embodiment, an adjustable unit can further be provided in the discharge hole 35 of the covers 33, 34, for adjusting a discharge speed of the residues of the plastic material in accordance with the characters of the plastic material. Therefore, by provision of such adjustable unit, there is no need to replace the check shaft 32 by another when a different plastic material is to be adopted, but only a flow speed of plastic material residues should be adjusted by the adjustable unit in accordance with the fluidity of the plastic material to be adopted.

Figure 2:
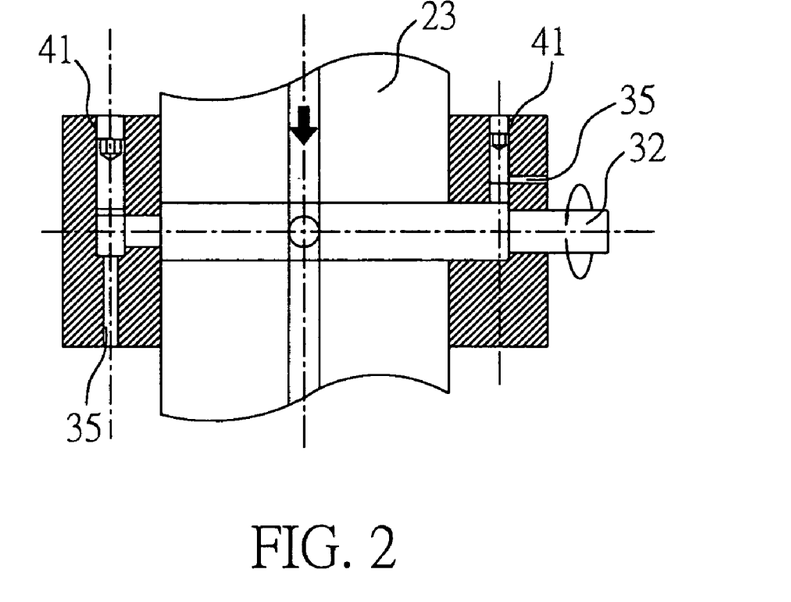
FIG. 2 is a schematic diagram showing the discharge apparatus for two-stage injection molding machine according to a second embodiment of the present invention.

FIG. 2 shows a discharge apparatus according to a second embodiment of the present invention, which has an adjustable bolt 41 respectively provided in the first cover 33 and the second cover 34, for adjusting the diameter of the discharge hole 35 to thereby adjust the discharge speed of the residues of the plastic material. Therefore, when feeding of the plastic material is being performed or stopped, the diameter of the discharge hole 35 can be adjusted in accordance with the characters of the plastic material so as to prevent the check shaft 32 from being locked and the finished products from being polluted by degraded residues of plastic material. For example, if the plastic material has high fluidity, the adjustable bolt 41 is rotated to move forward or backward to adjust the diameter of the opening of the discharge hole 35 so as to perform better precise measurement of material discharge. Even in case the material discharge should be stopped, the adjustable bolt 41 is locked to close the discharge hole 35.

Figure 3:
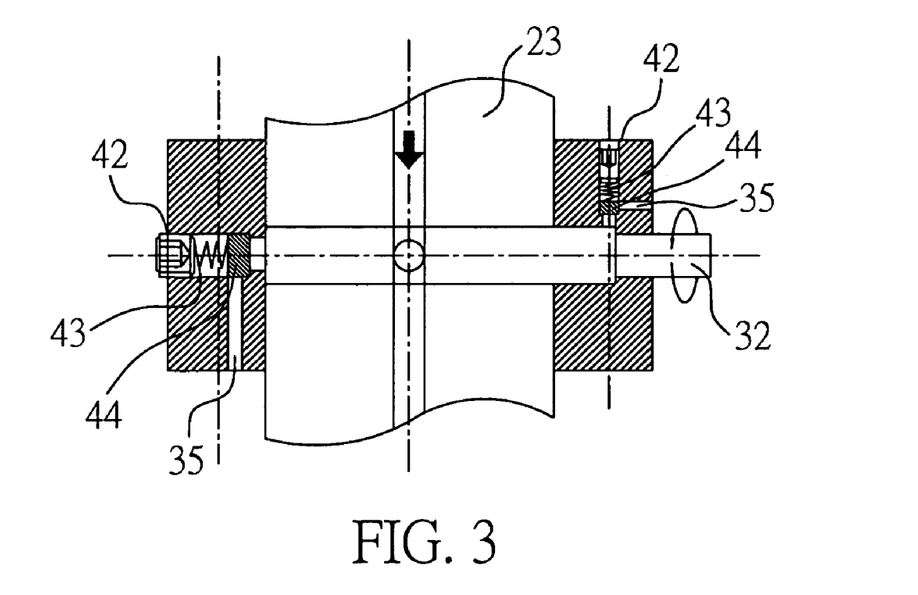
FIG. 3 is a schematic diagram showing the discharge apparatus for two-stage injection molding machine according to a third embodiment of the present invention.

FIG. 3 shows a discharge apparatus according to a third embodiment of the present invention, which relates to an alternative design of the adjustable unit, wherein the adjustable unit is a combination of an adjustable bolt 42, an adjustable spring 43 and a leakage stop block 44. When feeding of the plastic material is being performed or stopped, in accordance with the characters of the plastic material, the adjustable bolt 42 is employed to adjust a pressure applied by the adjustable spring 43 and the leakage stop block 44 to the discharge hole 35 to determine the leakage degree, thereby preventing the check shaft 32 from being locked or the finished products from being polluted by degraded residues of plastic material.

Figure 4:
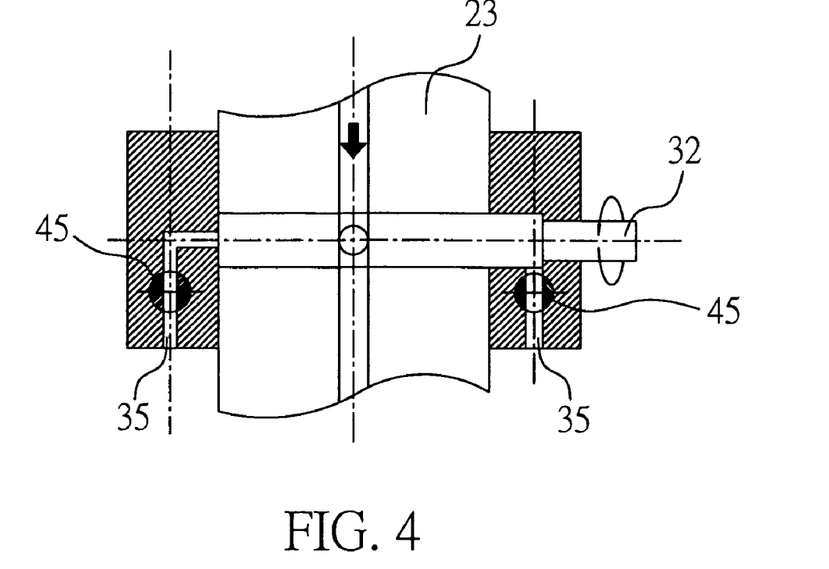
FIG. 4 is a schematic diagram showing the discharge apparatus for two-stage injection molding machine according to a fourth embodiment of the present invention.

FIG. 4 shows a discharge apparatus according to a fourth embodiment of the present invention, which modifies the adjustable unit to be an adjustable shaft 45, wherein the adjustable shaft 45 is a rod having a through hole for the plastic material to flow therethrough. The adjustable shaft 45 can be employed to adjust opening or closing of the discharge hole 35 in accordance with the characters of the plastic material. In other words, the adjustable shaft 45 acts as a valve to adjust the discharge speed of the residues of the plastic material, so as to similarly prevent the check shaft 32 from being locked or the finished products from being polluted by degraded residues of plastic material.

Therefore, by the discharge apparatus for two-stage injection molding machine in the present invention, a problem of the check shaft being locked in the conventional technology is solved, and pollution from degraded residues of plastic material to finished products can be prevented, thereby extending the overall lifetime. Further, the design of the present invention provides functions of precisely metering material leakage and collecting material residues, thereby avoiding a problem of affecting the overall appearance due to an uncontrollable material leakage path.

The invention has been described using exemplary preferred embodiments. However, it is to be understood that the scope of the invention is not limited to the disclosed embodiments. On the contrary, it is intended to cover various modifications and similar arrangement. The scope of the claims therefore should be accorded the broadest interpretation so as to encompass all such modifications and similar arrangements.

What is claimed is:

1. A discharge apparatus for a two-stage injection molding machine, comprising:
    a check shaft seat having a runner, and disposed between a feeding portion and an injection portion of the two-stage injection molding machine, for allowing a plastic material in the feeding portion to enter the injection portion via the runner;
    at least one check shaft disposed in the check shaft seat, and for opening and closing the runner via movement of the check shaft;
    at least one cover provided at a side of the check shaft seat, and having at least one discharge hole in communication with a gap formed between the check shaft and the check shaft seat, for discharging residues of the plastic material located in the gap; and
    at least one flow-regulating unit disposed in the cover for adjusting an opening of the discharge hole, thereby adjusting an amount of flow of the residues of the plastic material discharging therethrough.

2. The discharge apparatus of claim 1, wherein the check shaft is rotatable to open the runner to supply the plastic material during feeding of the plastic material, and is rotatable to close the runner to stop supplying the plastic material when feeding of the plastic material is stopped.

3. The discharge apparatus of claim 1, wherein the flow-regulating unit comprises
    at least one adjustable bolt that adjusts the amount of flow of the plastic material discharging through the discharge hole.

4. The discharge apparatus of claim 3, wherein the adjustable bolt adjusts the opening of the discharge hole in accordance with characteristics of the plastic material.

5. The discharge apparatus of claim 3, wherein the adjustable bolt is provided in the discharge hole of the cover.

6. The discharge apparatus of claim 3, wherein the check shaft is rotatable to open the runner to supply the plastic material during feeding of the plastic material, and is rotatable to close the runner to stop supplying the plastic material when feeding of the plastic material is stopped.

7. The discharge apparatus of claim 1, wherein the flow-regulating unit comprises an adjustable spring disposed between an adjustable bolt and a movable leakage stop block.

8. The discharge apparatus of claim 7, wherein the adjustable bolt is for adjusting a pressure applied to the movable leakage stop block in accordance with characteristics of the plastic material.

9. The discharge apparatus of claim 7, wherein the adjustable bolt, adjustable spring and movable leakage stop block are provided in the discharge hole of the cover.

10. The discharge apparatus of claim 7, wherein the check shaft is rotatable to open the runner to supply the plastic material during feeding of the plastic material, and is rotatable to close the runner to stop supplying the plastic material when feeding of the plastic material is stopped.

11. The discharge apparatus of claim 1, wherein the flow-regulating unit comprises at least one adjustable shaft that adjusts the amount of flow of the plastic material discharging through the discharge hole.

12. The discharge apparatus of claim 11, wherein the adjustable shaft is for adjusting the opening of the discharge hole in accordance with characteristics of the plastic material.

13. The discharge apparatus of claim 11, wherein the adjustable shaft is provided in the discharge hole of the cover.

14. The discharge apparatus of claim 11, wherein the adjustable shaft comprises a rod having a through hole for the plastic material to flow therethrough.

15. The discharge apparatus of claim 11, wherein the check shaft is rotatable to open the runner to supply the plastic material during feeding of the plastic material, and is rotatable to close the runner to stop supplying the plastic material when feeding of the plastic material is stopped.

16. The discharge apparatus of claim 1, wherein the at least one cover comprises at least two covers, each being on an opposite end of the check shaft and each having at least one discharge hole that is in constant communication with the gap formed between the check shaft and the check shaft seat, for discharging residues of the plastic material.

17. A discharge apparatus for a two-stage injection molding machine, comprising:
- a check shaft seat having a runner, and disposed between a feeding portion and an injection portion of the two-stage injection molding machine, for allowing a plastic material in the feeding portion to enter the injection portion via the runner;
- at least one check shaft disposed in the check shaft seat, and for opening and closing the runner via movement of the check shaft;
- at least two covers provided on the check shaft seat and on an opposite ends of the check shaft, each cover having at least one discharge hole in communication with a gap formed between the check shaft and the check shaft seat, for discharging residues of the plastic material located in the gap; and
- at least two flow-regulating units, each being disposed in a respective cover for adjusting an opening of the discharge hole, thereby adjusting an amount of flow of the residues of the plastic material discharging therethrough.

18. The discharge apparatus of claim 17, wherein each flow-regulating unit comprises an adjustable bolt, an adjustable spring disposed between a movable leakage stop block and an adjustable bolt, or an adjustable shaft.

19. The discharge apparatus of claim 17, wherein the check shaft is rotatable to open the runner to supply the plastic material during feeding of the plastic material, and is rotatable to close the runner to stop supplying the plastic material when feeding of the plastic material is stopped.

20. A discharge apparatus for a two-stage injection molding machine, comprising:
- a check shaft seat having a runner, and disposed between a feeding portion and an injection portion of the two-stage injection molding machine, for allowing a plastic material in the feeding portion to enter the injection portion via the runner;
- at least one check shaft disposed in the check shaft seat, and for opening and closing the runner via movement of the check shaft;
- at least one cover provided at a side of the check shaft seat, and having at least one discharge hole that is in constant communication with a gap formed between the check shaft and the check shaft seat, for discharging residues of the plastic material located in the gap; and
- at least one flow-regulating unit disposed in the cover for adjusting an opening of a discharge hole, thereby adjusting an amount of flow of the residues of the plastic material discharging therethrough.

21. The discharge apparatus of claim 20, wherein the flow-regulating unit comprises from an adjustable bolt, an adjustable spring disposed between a movable leakage stop block and an adjustable bolt, or an adjustable shaft.

22. The discharge apparatus of claim 20, wherein the check shaft is rotatable to open the runner to supply the plastic material during feeding of the plastic material, and is rotatable to close the runner to stop supplying the plastic material when feeding of the plastic material is stopped.

\* \* \* \* \*